United States Patent [19]
Pitti

[11] Patent Number: 4,784,092
[45] Date of Patent: Nov. 15, 1988

[54] LIQUID TO VAPOR FUEL CONVERTER SYSTEM

[76] Inventor: Edward Pitti, 30 Shelden Blvd., Centereach,, N.Y. 11720

[21] Appl. No.: 104,267

[22] Filed: Oct. 2, 1987

[51] Int. Cl.⁴ ............................................. F02M 21/02
[52] U.S. Cl. ...................................... 123/525; 123/557; 165/51
[58] Field of Search ........................ 123/525, 557, 549; 165/51

[56] References Cited

U.S. PATENT DOCUMENTS

| | | | |
|---|---|---|---|
| 3,306,273 | 2/1967 | Dolphin | 123/557 |
| 4,180,036 | 12/1979 | Wolf | 123/557 |
| 4,342,303 | 8/1982 | McCord | 123/557 |
| 4,494,516 | 1/1985 | Covey, Jr. | 123/557 |
| 4,510,912 | 4/1985 | Gamble | 123/525 |
| 4,606,319 | 8/1986 | Silva | 123/525 |

*Primary Examiner*—E. Rollins Cross
*Attorney, Agent, or Firm*—Richard L. Miller

[57] ABSTRACT

This system is designed to increase gasoline mileage of automotive vehicles. Primarily, it consists of a two way selector valve connected to the vehicle's fuel pump and the carburetor, and also to a volume control valve connected to a heat exchanger that is connected to the air filter of the carburetor. The heat exchanger is mounted in the engine exhaust pipe as is a temperature sensor, and after the engine is started, the temperature sensor actuates a solenoid that rotates the selector valve to by-pass the liquid fuel into the heat exchanger which immediately vaporizes the liquid fuel as it passes into the air filter of the carburetor. The volume control valve is also coupled by linkage to the vehicle's accelerator pedal.

11 Claims, 1 Drawing Sheet

LIQUID TO VAPOR FUEL CONVERTER SYSTEM

BACKGROUND OF THE INVENTION

The instant invention relates generally to carburization in internal combustion engines, and more particularly, to a liquid vapor fuel converter system.

Numerous fuel vapor systems have been provided in the prior art that are adapted to increase the volumetric efficiencies of engines. While these units may be suitable for the particular purpose to which they address, they would not be as suitable for the purpose of the present invention as hereafter described.

SUMMARY OF THE INVENTION

A primary object of the present invention is to provide a liquid to vapor fuel convertor system that will overcome the shortcomings of the prior art devices.

Another object is to provide a liquid to vapor fuel converter system, which will be of such design, as to substantially increase gasoline mileage.

An additional object is to provide a liquid to vapor fuel converter system, which will employ a solenoid operated selector valve cooperating with a temperature sensor and coil in an engine exhaust pipe to provide control of the vaporized fuel.

A further object is to provide a liquid to vapor fuel converter system that is simple and easy to use.

A still further object is to provide a liquid to vapor fuel converter system that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only and that changes may be made in the specific construction illustrated and described within the scope of the appended claims.

BRIEF DESCRIPTION OF THE DRAWING FIGURES

The figures in the drawings are briefly described as follows.

DETAILED DESCRIPTION OF THE PREFERRED EMBODIMENTS

Figure 1:
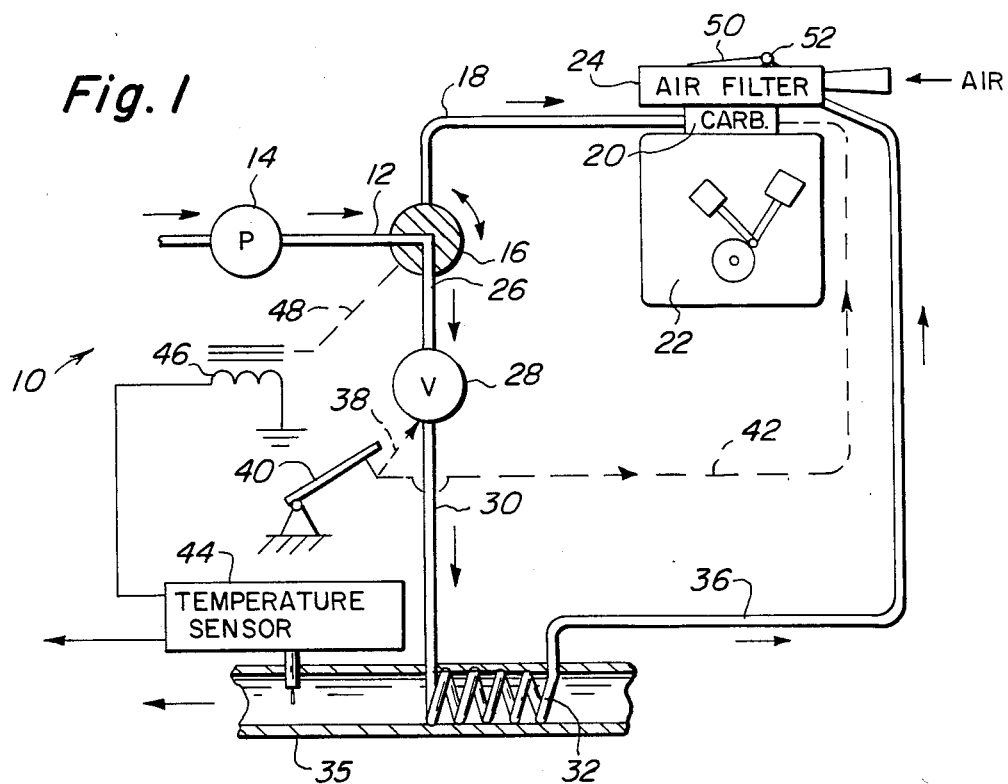
FIG. 1 is a diagrammatic view of the present invention.
Figure 2:
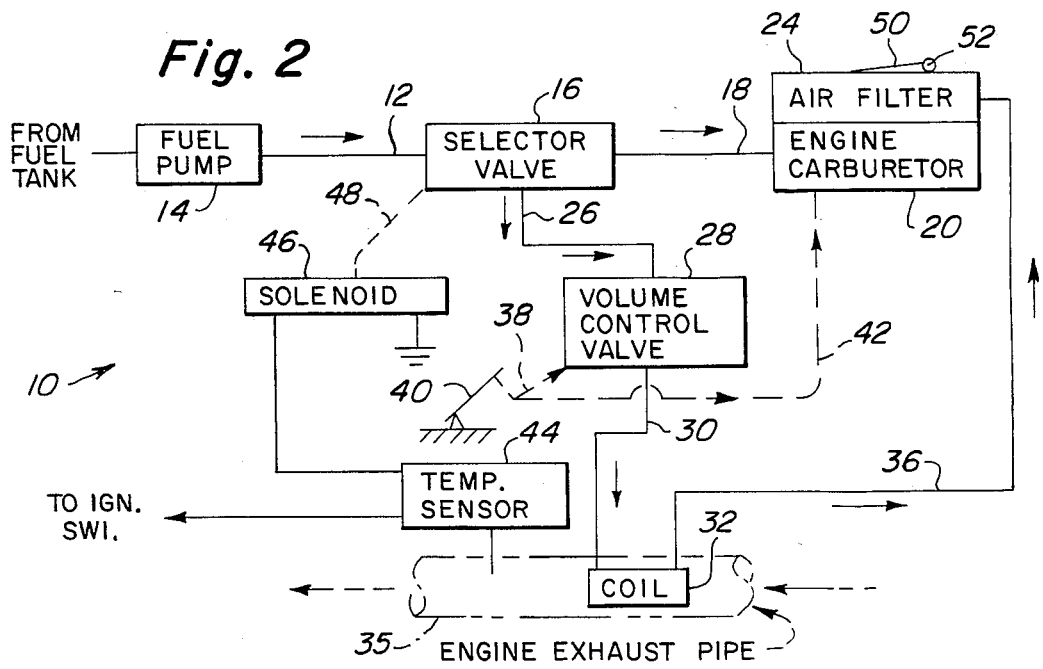
FIG. 2 is a block diagram of the invention.
Figure 4:
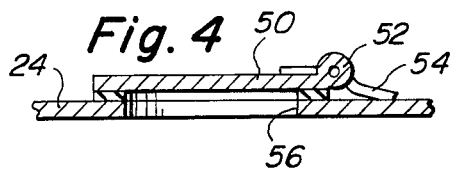
FIG. 4 is a cross sectional view taken on line 4—4 of FIG. 3.
Figure 3:
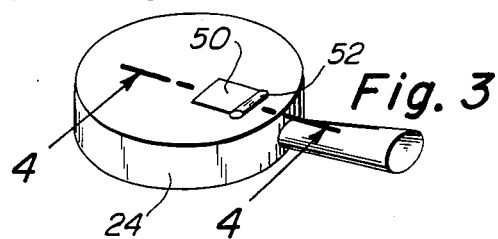
FIG. 3 is a perspective view of a typical air filter provisioned for any accidental backfire.

Turning now descriptively to the drawings, in which like reference characters denote like elements throughout the line 12 connected to a fuel 14 connected to the output of a fuel tank (not shown). Output line 12 is also connected to an input side of a two-way selector valve 16, and a first output line 18 of a selector valve 16 is connected to the normal liquid fuel input of carburetor 20 of internal combustion engine 22 having an air filter 24. The first output line 18 provides for liquid fuel input to engine 22 when engine 22 is in cold condition upon starting thereof.

A second fuel output line 26 is connected to the two-way selector valve 16 and is connected to the input of a volume control valve 28. An input line 30 of a metal coil heat exchanger 32 secured in exhaust pipe 35 of engine 22 is provided for fuel to enter exchanger 32, and an output line 36 is connected to the output of exchanger 32 and is connected to air filter 24 for feeding of vaporized fuel into engine 22.

Linkage 38 is secured to volume control valve 28 and is secured to accelerator pedal 40 of the vehicle (not shown), for throttle control of engine after engine warm-up and second linkage 42 secured to pedal 40 and the carburetor 20, provides for engine control through its throttle, when temperature sensor 44 is operable.

Temperature sensor 44 is secured in exhaust pipe 35 behind the heat exchanger 32, and is designed to actuate at a pre-determined temperature of the engine when ignition switch is on. Solenoid 46 that is coupled by linkage 48 to selector valve 16.

A protective flap valve 50 is provided and includes a hinge 52 that is fastened to the top of air filter 24. Valve 50 also includes a biasing spring 54 for keeping flap valve 50 closed over air intake opening 56 of the carburetor 20 during normal operation of system 10. Valve 50 is specifically designed to open in the event of backfire occurring through the carburetor, thus preventing fire from occurring.

In operation, when the engine 22 is started, liquid fuel from the pump 14 enters into selector valve 16, which is normally open to discharge the liquid fuel into the carburetor 20 through line 18 when engine 22 is in cold condition.

After running the exhaust gases passing through heat exchanger 32, raise the temperature of the heat exchanger 32 and the temperature sensor 44 actuates solenoid 46, causing solenoid 46 to rotate selector valve 16 and switch fuel from the carburetor into the heat exchanger 32, where the liquid fuel is immediately vaporized and passes out into line 36 into the air filter 24, where it travels into the air filter and then into the air intake of carburetor 20 for mixing with air for combustion to take place in the engine 22. The accelerator pedal 40 provides for the rotation of volume control valve 28, so as to provide a complete range of engine throttling.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

What is claimed is:

1. A liquid to vapor fuel converter system, comprising, a heat exchanger secured in an engine exhaust pipe, for vaporizing liquid fuel passing into an air filter of a carburetor of an internal combustion engine, a temperature sensor secured in said exhaust pipe, for actuating a solenoid coupled to a rotatable two-way selector valve, for by-passing said liquid into a volume control valve and into said heat exchanger where said liquid fuel is vaporized when said engine is warming up, and linkage means secured to said volume control valve and an accelerator pedal, for control of vaporized fuel entering said carburetor.

2. A liquid to vapor fuel converter system as set forth in claim 1, wherein said heat exchanger comprises a coiled tubing fixedly secured in said exhaust pipe and said temperature sensor is secured in said exhaust pipe, is spaced from said heat exchanger and is wired in series with said solenoid and an ignition switch of said engine, and when a pre-determined temperature set in said sensor is reached by exhaust gas heat, an linkage of said solenoid and secured to said selector valve, rotates said selector valve and cuts off flow of said liquid fuel to said carburetor from a coupled fuel pump of said system, and causes said liquid fuel to flow into an input of said heat exchanger where said liquid fuel vaporizes by exhaust heat means and travels into said air filter and into said carburetor of said engine.

3. A liquid to vapor fuel converter system as set forth in claim 2 wherein a first output line is connected to a first output of said selector valve and to said carburetor for said liquid fuel for running said engine when said engine is cold, and a second output line is connected to a second output of said selector valve and is connected to said input of said heat exchanger, and an accelerator pedal is provided for throttle of said engine, is coupled by said linkage means to said volume control valve and rotates said volume control val and regulates said liquid fuel flow into said heat exchanger when said solenoid has by-passed said liquid fuel into said volume control valve and into said input of said heat exchanger, and a flap valve is provided on a top surface of said carburetor, for release of a possible backfire pressure occurrence.

4. A liquid to vapor fuel converter system as set forth in claim 3, wherein said flap valve includes an attached hinge secured to said top surface of said carburetor, and a hinge secured to said flap valve is secured to said top surface and normally keeps said flap valve closed over an opening in said carburetor, and if a backfire should occur, said flap valve pivots open and releases backfire pressure.

5. A liquid to vapor fuel converter system, for an internal combustion engine comprising:
 (a) a heating means for vaporizing fuel;
 (b) a selector valve for directing fuel to either said heating means or to a conventional carburetor of said internal combustion engine;
 (c) automatic means responsive to at least one parameter of said internal combustion engine for controlling said selector valve; and
 (d) means responsive to the commands of an operator for controlling the quantity of fuel used to power said internal combustion engine, and wherein said automatic means responsive to at least one parameter of said internal combustion engine for controlling said selector valve includes;
 (e) temperature sensor means mounted in intimate contact with said internal combustion engine whereby an electrical output of said temperature sensor means is responsive to temperature sensed; and
 (f) said selector valve is an electrically controlled valve responsive to said temperature sensed, whereby the ratio of fuel directed to said heat means and said conventional carburetor is a function is said temperature sensed.

6. A liquid to vapor fuel converter system, for an internal combustion engine as recited in claim 5, wherein said temperature sensor mounted in intimate contact with said internal combustion engine is directly in the exhaust path of combustion products exiting said internal combustion engine.

7. A liquid to vapor fuel converter system, for an internal combustion engine as recited in claim 5, wherein said heating means for vaporizing fuel is:
 (a) heat exchanger mounted in intimate contact with said internal combustion engine; and
 (b) fluid coupling means directing fuel thereby vaporized into an air intake of said internal combustion engine.

8. A liquid to vapor fuel converter system, for an internal combustion engine as recited in claim 7, wherein said heat exchanger mounted in intimate contact with said internal combustion engine is directly in the exhaust path of combustion products exiting said internal combustion engine.

9. A liquid to vapor fuel converter system, for an internal combustion engine as recited in claim 5, wherein said means responsive to the command of an operator for controlling the quantity of fuel used to power said internal combustion engine is a mechanical linkage which simultaneously controls:
 (a) fuel and air intake permitted to said conventional carburetor; and
 (b) a volume control valve fluidly connected between an output of said selector valve, and an input of said heating means.

10. A liquid to vapor fuel converter system, for an internal combustion engine as recited in claim 9, wherein said heating means for vaporizing fuel is:
 (a) heat exchanger mounted in intimate contact with said internal combustion engine; and
 (b) fluid coupling means directing fuel thereby vaporized into an air intake of said internal combustion engine.

11. A liquid to vapor fuel converter system, for an internal combustion engine as recited in claim 10, wherein said heat exchanger mounted in intimate contact with said internal combustion engine is directly in the exhaust path of combustion products exiting said internal combustion engine.

* * * * *